United States Patent Office 3,644,640
Patented Feb. 22, 1972

---

3,644,640
S-SUBSTITUTED MERCAPTO-2,4-DINITROPHENYL ACETATE ACARICIDES
Arnold D. Gutman, Pinole, and Thomas B. Williamson, Santa Clara, Calif., assignors to Stauffer Chemical Company, New York, N.Y.
No Drawing. Original application Oct. 6, 1965, Ser. No. 493,569. Divided and this application Sept. 29, 1969, Ser. No. 870,836
Int. Cl. A01n 9/12
U.S. Cl. 424—311                                   6 Claims

ABSTRACT OF THE DISCLOSURE

A method of killing acarids by the application of S-substituted mercapto-2,4-dinitrophenyl acetates.

---

This application is a division of copending application Serial No. 493,569, filed Oct. 6, 1965, now abandoned.

This invention relates to certain new and novel 2,4-dinitrophenyl esters and their use as insecticides, acaricides and herbicides. More specifically, this invention pertains to certain S-substituted mercapto-2,4-dinitrophenyl acetates and to the utility of said compounds in insecticidal, acaricidal and herbicidal compositions.

The compounds comprising the instant class correspond to the general formula

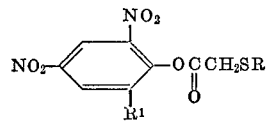

wherein R is selected from the group consisting of alkyl radicals containing from 1 to 8 carbon atoms, inclusive, phenyl and substituted phenyl wherein said substituents are halogen, and alkyl; $R^1$ is selected from the group hydrogen and sec-butyl. Also included is a method of preparing, using and applying said compositions.

The new compounds of this invention can be prepared by several methods. One such general method applied in preparing the compounds was the condensation reaction between the appropriate S - substituted mercapto acetyl chloride and 2,4-dinitrophenol or 2,4-dinitro-6-sec-butylphenol. The addition of a hydrogen chloride acceptor is favorable in assisting the reaction. The reaction proceeds readily in the liquid phase. The employment of an inert organic solvent is also useful, facilitating processing as well as agitation of the reactants. Temperatures that permit operation in the liquid phase and which allow controllable reaction conditions are employed.

It has been found that the compounds of the present invention are particularly effective as insecticides and acaricides.

The compounds of the present invention may be made in accordance with the following examples.

EXAMPLE 1

Preparation of n-amylmercapto-2,4-dinitro-6-sec-butylphenyl acetate

In a 500 ml. 3-neck flask fitted with a stirrer, a thermometer, and a dropping funnel were added together 10 g. (0.055 mole) of n-amylmercaptoacetyl chloride, 14.4 g. (0.060 mole) of 2,4-dinitro-6-sec-butylphenol in 150 ml. of benzene as solvent. The mixture was cooled to 10° C. with an ice bath. Sodium hydroxide solution, 2.4 g. (0.06 mole) dissolved in 25 ml. of water, was added through a dropping funnel to the stirred mixture at such a rate that the temperature did not exceed 15° C. After the addition was complete, the mixture was allowed to warm to room temperature and was stirred for an additional hour. The mixture was transferred to a separatory funnel, and an additional 150 ml. of benzene was added. The aqueous phase was withdrawn, and the benzene layer was washed with 2–100 ml. portions of water. The benzene phase was dried with anhydrous magnesium sulfate and was evaporated with a rotary evaporator.

There was obtained 15.0 g. (96.3 percent of theory) of the title compound, $n_D^{30}=1.5173$.

EXAMPLE 2

Preparation of p-chlorophenylmercapto-2,4-dinitro-6-sec-butylphenyl acetate

In a similar manner as described in Example 1 p-chlorophenylmercapto acetyl chloride (11.0 g., 0.05 mole) and 2,4 - dinitro-6-sec-butylphenol (12.0 g., 0.05 mole) were combined in 150 ml. of benzene as a solvent. The mixture was cooled to 10° C. with an ice bath. Sodium hydroxide solution, 2.0 g. (0.05 mole) dissolved in 25 ml. of water, was added through a dropping funnel to the stirred mixture at such a rate that the temperature did not exceed 15° C. After the addition was complete, the mixture was allowed to warm to room temperature and was then stirred for an additional hour. The product was isolated by the method described in Example 1.

There was obtained 20.3 g. (96.0 percent theory) of the title compound, $n_D^{30}=1.5762$.

The following is a table of the compounds prepared according to the aforedescribed procedures. Compound numbers have been assigned to each compound and are used throughout the balance of the application.

TABLE I

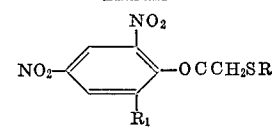

| Compound No. | R | $R^1$ | $n_D^{30}$ |
|---|---|---|---|
| 1[1] | n-amyl | sec-butyl | 1.5173 |
| 2 | n-hexyl | sec-butyl | 1.5198 |
| 3 | i-propyl | sec-butyl | 1.5362 |
| 4 | n-butyl | sec-butyl | 1.5337 |
| 5 | n-octyl | sec-butyl | 1.5200 |
| 6[2] | p-chlorophenyl | sec-butyl | 1.5762 |
| 7 | phenyl | sec-butyl | 1.5750 |
| 8 | n-butyl | hydrogen | 1.5450 |
| 9 | p-sec-butylphenyl | sec-butyl | 1.5646 |
| 10 | methyl | sec-butyl | 1.5380 |

[1] No. 1 prepared in Example 1.
[2] No. 6 prepared in Example 2.

As previously mentioned, the herein described compositions produced in the above-described manner are biologically active compounds which are useful and valuable in controlling various pest organisims. The compounds of this invention were tested in the following manner.

Acaricidal evaluation test.—The two-spotted mite, *Tetranychus telarius* (Linn.), was employed in tests for miticides. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v./v. Sponto 221® (a polyoxy-ethylene ether of alkylated phenols blended with organic sulfonates), an emulsifying agent, the amount of water being sufficient to give concentrations of active ingredient ranging from 0.25% to 0.0008%. The test suspensions were then sprayed on the infested pinto bean plants. After seven days, mortalities of post-embryonic and ovicidal forms were determined. The percentage of kill was determined by comparison with control plants which had not been sprayed with the candidate compounds. The LD–50 value was calculated using well-known procedures. These values are reported under the columns "PE" and "Eggs" in Table II.

TABLE II

| Compound No. | Acaricidal activity (percent) Two-spotted mite | |
| --- | --- | --- |
| | PE | Eggs |
| 1 | .01 | .03 |
| 2 | .03 | .05 |
| 3 | .005 | .05 |
| 4 | .001 | .01 |
| 5 | .005 | .008 |
| 6 | .003 | .03 |
| 7 | .003 | .02 |
| 8 | .01 | .05 |
| 9 | .005 | .05 |
| 10 | .003 | .05 |

Compounds number 5 and 6 were also found to have an LD–50 value of 0.1 percent against houseflies—*Musca domestica* (Linn.).

The spotted milkweed bug—*Oncopoltus fasciatus* (Dallas), was found to have an LD–50 of 0.1 percent for compounds number 3, 4 and 7, and compound number 10 an LD–50 of 0.05 percent. Compounds number 3, 4 and 5 have an LD–50 value of 0.1 percent against salt-marsh caterpillar—*Estigmene acrea* (Drury). Compound number 2 has an LD–50 of 0.08 percent against salt-mash caterpillar.

The herein contemplated new compositions were also found to be effective as herbicides. They are particularly effective in the control of grasses and broadleaf plants with both pre-emergence and post-emergence activity. The compounds are phytotoxic and find utility in controlling various plant species. When applied at 20 lbs./acre the following compounds showed 85 to 100% pre-emergence herbicide control on at least three grass weeds and at least two broadleaf weeds: 1, 2, 3, 4, 6, 7 and 10. At a post-emergence application rate of 12.5 lbs./acre, the following compounds controlled at least two grass weeds and two broadleaf species: 1, 2, 3, 5, 7, 8, 9 and 10.

The compounds of the present invention may be used as effective insecticides, acaricides and herbicides and may be applied in a variety of ways at various concentrations. In practice the compounds are usually formulated with an inert pesticidal adjuvant, utilizing methods well-known to those skilled in the art, thereby making them suitable for application as dusts, sprays or drenches and the like. The amount applied will depend upon the nature of the insects, weeds or seeds to be controlled. The rate of application may vary from 1 to 50 pounds per acre. The particular method of application to an insect's habitat of compositions comprising the compounds of the present invention are well-known to those skilled in the art.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. The method of killing acarids comprising applying to the acarid an acaricidally effective amount of a compound of the formula

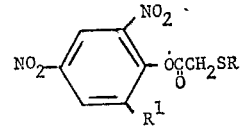

wherein R is a member selected from the group consisting of alkyl radicals containing from 1 to 8 carbon atoms, inclusive, phenyl, and para-substituted phenyl, wherein said substituents are chlorine and sec.-butyl; $R^1$ is selected from the group consisting of hydrogen and sec.-butyl.

2. The method of killing acarids comprising applying to the acarid an acaricidally effective amount of the compound n-butyl-mercapto-2,4-dinitro-6-sec-butylphenyl acetate.

3. The method of killing acarids comprising applying to the acarid an acaricidally effective amount of the compound p-chlorophenylmercapto - 2,4 - dinitro-6-sec-butylphenyl acetate.

4. The method of killing acarids comprising applying to the acarid an acaricidally effective amount of the compound phenylmercapto-2,4-dinitro-6-sec-butylphenyl acetate.

5. The method of killing acarids comprising applying to the acarid an acaricidally effective amount of the compound p-sec-butylphenylmercapto-2,4-dinitro-6-sec-butylphenyl acetate.

6. The method of killing acarids comprising applying to the acarid an acaricidally effective amount of the compound methylmercapto-2,4-dinitro-6-sec-butylphenyl acetate.

References Cited
UNITED STATES PATENTS

| 2,384,306 | 9/1945 | Hester et al. | 424—311 |
| 3,123,522 | 3/1964 | Scherer et al. | 424—311 X |
| 3,266,884 | 8/1966 | Boogaart | 260—473 X |
| 3,420,868 | 1/1969 | Weil | 424—311 X |

ALBERT T. MEYERS, Primary Examiner

N. A. DREZIN, Assistant Examiner